June 12, 1956   R. J. McGOLDRICK   2,750,490
EMERGENCY LIGHTING UNIT FOR SHIPS
Filed Nov. 21, 1952   2 Sheets-Sheet 2
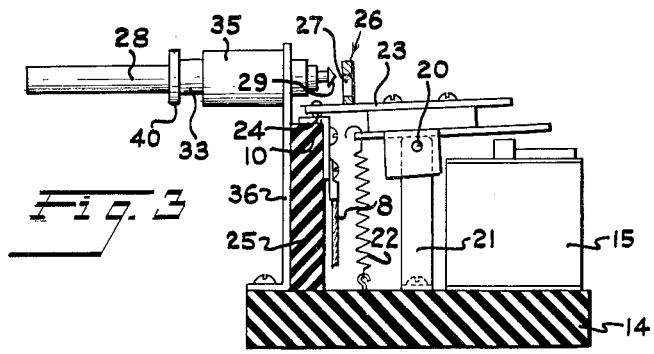
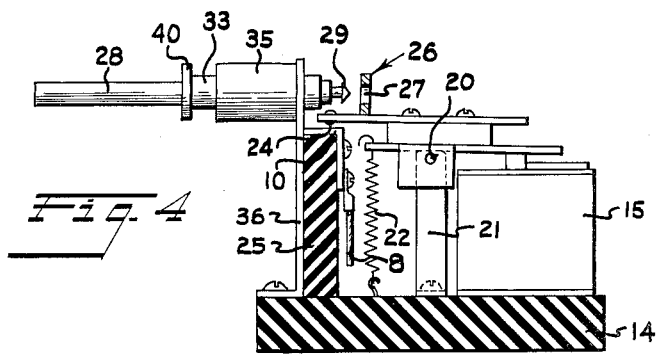
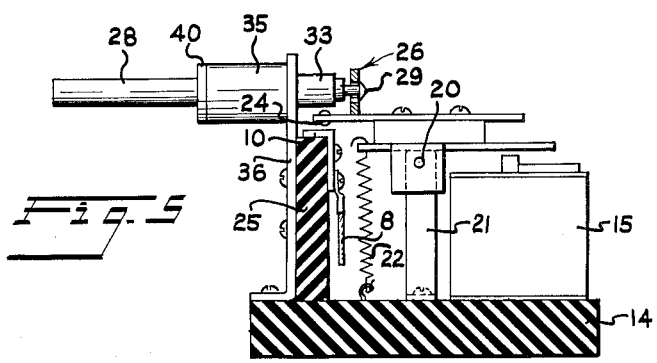
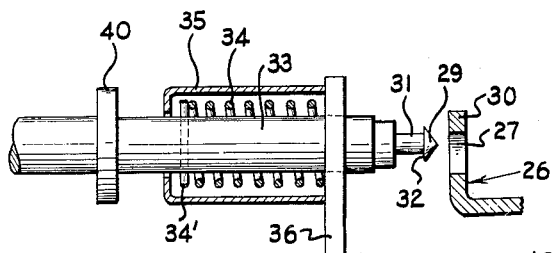
INVENTOR
RAYMOND J. McGOLDRICK
ATTORNEY

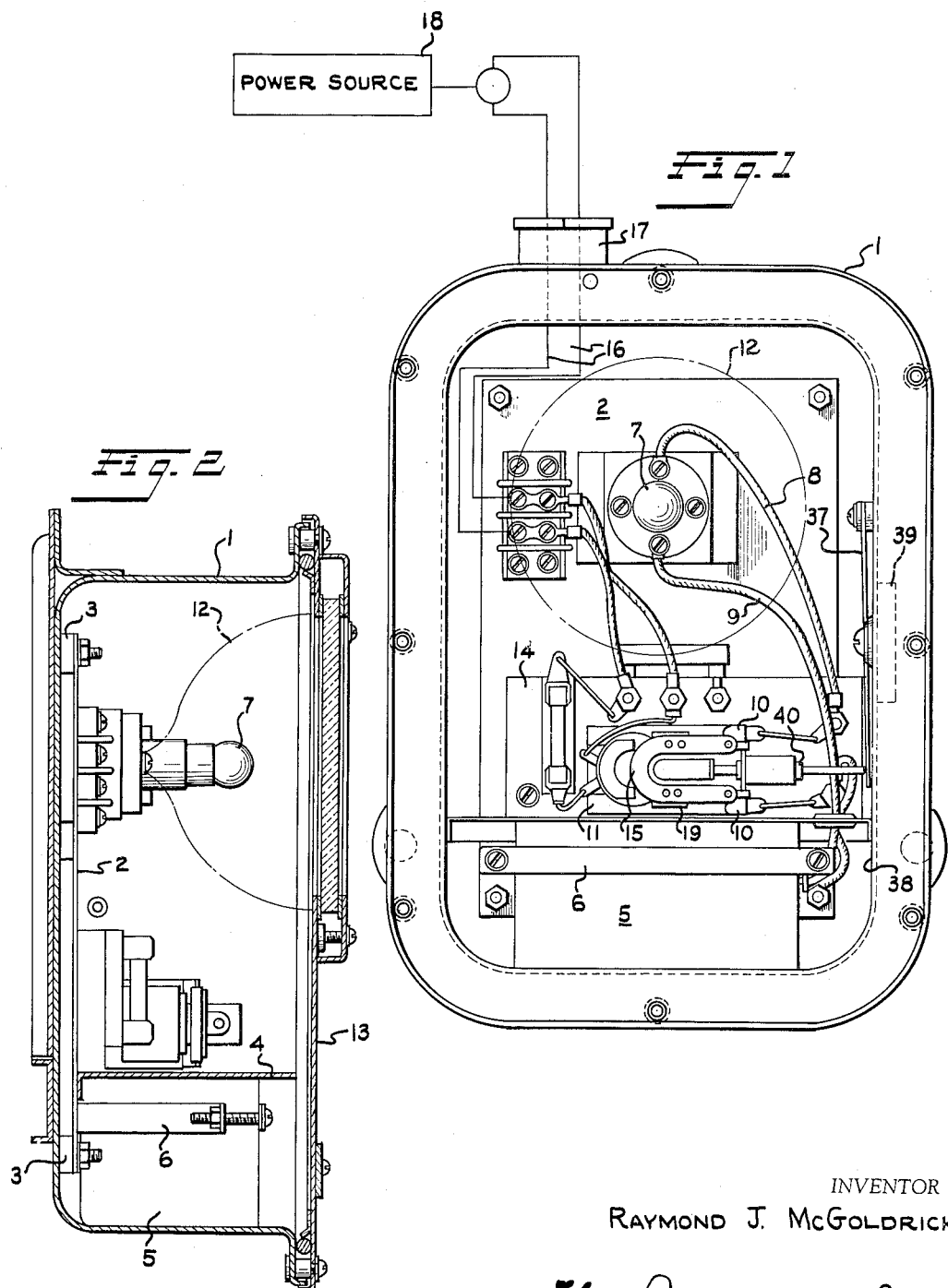

United States Patent Office 2,750,490
Patented June 12, 1956

2,750,490

EMERGENCY LIGHTING UNIT FOR SHIPS

Raymond J. McGoldrick, Auburndale, Mass.; Mary B. McGoldrick, administratrix of said Raymond J. McGoldrick, deceased Application November 21, 1952, Serial No. 321,795

2 Claims. (Cl. 240—37.1)

This invention relates to an emergency lighting unit for ships to provide emergency lighting in limited spaces on a ship when the main or emergency power driven generating units are crippled by accident or enemy action.

It is of particular value on ships exposed to enemy action to provide light in vital spaces of a ship when the power distribution system of the ship becomes interrupted, as when cables and power plants of the lighting system of a ship are put out of commission by enemy action.

It is an object of this invention to provide a lamp, with its source of current, and its controlling switch means in a watertight casing so that the emergency unit is self-contained, and with its controlling switch means so arranged that when the unit is connected to the normally energized lighting system of a ship the battery is disconnected from the lamp, but should the ship's lighting system, connected to the unit, become de-energized, then the battery is automatically connected to the lamp during the period of de-energization of the ship's lighting system connected to the unit, and is automatically disconnected from the lamp should the ship's system connected to the unit become energized.

It is also a further and important object of this invention to provide the emergency lighting unit having the above object, with manually operable switch means whereby the battery is disconnected from the lamp at will when the ship's lighting system connected to the unit is de-energized at will, and with means to automatically restore the unit for automatic emergency operation when the ship's connected lighting system becomes energized.

It is an object of this invention to provide an emergency lighting unit for permanent connection to the electric mains of a ship, and with the emergency unit comprising a lamp, a battery, and switch means to automatically connect the battery to the lamp in response to accidental de-energization of the connected electric mains, and with the provision of manually operable switch means to lockingly disconnect the battery from the lamp when the electric mains are de-energized at will, and with the provision of means to release the locking means and restore the emergency unit for automatic operation upon subsequent energization of the electric mains at will.

It is a further and important object of this invention to provide an emergency lighting unit for permanent connection to the electric mains of a ship, with the unit comprising a casing housing a unitary assembly of co-operating switch means arranged removable as a unitary assembly from the casing.

It is an object of this invention to provide an emergency lighting unit for permanent connection to the electric mains of a ship and as part of the permanent equipment of a ship, and including an elongated casing adapted to be mounted with its major axis vertical, and with essential switch operating means disposed in said casing in relation to the major axis of the casing to avoid false operation of the switch means when the casing is subjected to severe mechanical shocks.

In the drawings:

Figure 1 is a plan view looking into the front of the casing in its normal erected position, with circuit means in diagrammatic showing;

Figure 2 is a side view of the casing with parts in plan and parts in section;

Figures 3 to 5 illustrate different operational steps of switch means of Figure 1, with parts in elevation and with parts in section; and Figure 6 illustrates a detail of the switch means of Figures 3 to 5, with parts in elevation and with parts in section, and with parts broken.

With reference to Figures 1 and 2 of the drawings: A marine type elongated and dished casing 1, contains a metal plate 2, which is removably secured to the back of the casing, and is separated therefrom by resilient washers 3. A partition 4, on the plate divides the interior of the casing into upper and lower compartments. The lower compartment contains a battery 5, which is secured to the plate by straps 6, and the battery is connected to a lamp 7, in the upper compartment, by leads 8 and 9, and with the lead 8, being connected in series with a pair of switch contacts 10, of a relay 11. The lamp 7, is provided with a reflector 12, and the front of the casing is closed by a cover 13, which has a glass window facing the reflector.

The relay 11, is placed in the upper chamber, and is mounted on a base 14, of insulating material, and which base is secured to the back plate 2. The relay includes an electromagnet 15, which is connected through a fuse and through suitable terminals to a pair of power leads 16, which extend through a suitable bushing 17, on the casing for connection to a ship's source of power which is indicated schematically at 18, so that the electromagnet is normally energized when the ship's distribution system to which it is connected is energized.

The electromagnet 15, normally attracts an armature 19, which is pivoted at 20, on an outwardly projecting support 21, on the base 14, and the armature is normally urged away from the electromagnet by a spring 22, as shown in Figure 4.

Mounted on the armature 19, and suitably insulated from it, is a U-shaped member 23, the free ends of which carry contacts 24. When the electromagnet is de-energized the spring 22, tilts the armature so that the contact points 24, engage the contacts 10, and thus close the circuit connecting the battery with the lamp, as shown in Figure 3. The contacts 10 are mounted on a block of insulating material 25, which extends outwardly from the base 14.

It will now be clear that when the power leads 16, are energized the battery-lamp circuit is interrupted, and when the power leads become de-energized the battery-lamp circuit is closed automatically.

The self-contained units are adapted to be secured to bulkheads at vital points in a ship as permanent equipment of the ship, to furnish enough light for persons to work by should the usual main and emergency power driven units be put out of service by enemy action, or should the power cables feeding the vital points be interrupted.

The power circuits feeding the vital points may be interrupted at will, as, for instance, when the ship is in dry dock, or when the ship is idle in port and much of it is unoccupied. Under such conditions it is probable that few, if any, of the emergency lights are wanted in service. This suggests that manually operable means be provided for opening the battery circuits to save the batteries, but if such means were adopted they would necessitate the manual closing of the circuits when the ship put out to sea, and with the very grave risk of some circuits remaining disabled for automatic operation in an emergency in view of the fact that several hundred units would be installed on a ship. It is well known that portable battery-operated lamps have been provided on ships for emergency service, and that when the ships went into service after a lay-over in port the portable lamps were not available in an emergency.

The emergency units of this invention are not hand-portable, and are adapted for installation as permanent equipment. Means are provided in the units for manually opening the battery-lamp circuits, and for locking them open, when the distribution system of the ship has been interrupted at will, and to immediately release the locking means and so restore the units for service in an emergency when the distribution system is again energized at will.

Referring now to Figures 3 to 6 of the drawings: an outwardly projecting member 26, is secured on the armature 19, between the arms of the U-shaped member, and is apertured at 27. Disposed facing the member 26, is a plunger 28, provided with a conical latching and lifting end portion 29. When the electromagnet 15, is de-energized and the contacts 24, are in engagement with the contacts 10, to close the battery-lamp circuit, if the plunger 28, is pushed against the member 26, the tip of the cone enters the aperture 27, and further movement of the plunger towards the member 26, results in the lifting of the member 26, and also in the lifting of the U-shaped member 23, to lift the contacts 24, out of engagement with the contacts 10, and so interrupt the battery-lamp circuit. When the cone has passed through the aperture, the lip 30, of the member 26, drops behind the cone on to a reduced portion 31, of the plunger 28, and engages the rear flat face 32, behind the base of the cone. The reduced portion 31, is proportioned so that while the lip 30, drops slightly when it has passed over the cone, the U-shaped member 23, is still held in circuit-interrupting position, as best shown in Figure 5. The plunger 28, has an enlarged portion 33, which slides in a spring 34, engaging a stop or pin 34' on the plunger, in a tube 35, mounted on a support 36. The support 36 is secured to the insulating block 25, which carries the contacts 10. The spring urges the plunger away from the member 26, so the member 26 is held in locked relation against the face 32.

When the plunger is in its locking relation with the member 26, energization of the electromagnet causes tilting of the armature 19, and the lip 30, rises from behind the cone, and the plunger is released and moves away from the member 26, and the relay is now ready for emergency operation, as shown in Figure 4.

A leaf spring 37, is mounted on a sidewall 38, of the casing 1, and it carries a pushbutton 39, entered in an opening in the sidewall. The opening is covered by a flexible diaphragm which makes a watertight connection with the sidewall. The plunger 28, is manually actuated through the leaf spring. The released travel of the plunger is limited by the leaf spring, and its forward travel is limited by a stop member 40.

The relay 11, and its cooperating parts are mounted on the metal plate 2, before the plate is installed in the casing, and it is a simple matter to remove the plate so that the emergency assembly can be adjusted or repaired outside the casing.

When the emergency lighting unit is installed on the bulkhead of a ship the casing is disposed as shown in Figure 2, so that the relay extends horizontally from the back of the casing. It is in this horizontal position that the relay and its cooperating movable parts are best capable of withstanding severe mechanical shocks without false operation.

I claim:

1. An emergency lighting unit comprising, in combination, a relay including an armature and including an electromagnet connectable to a source of power, a battery, a lamp, switch means on said armature and movable in one direction of movement in response to de-energization of said electromagnet to connect said battery to said lamp in closed circuit relation, and movable in an opposite direction of movement in response to energization of said electromagnet to disconnect said battery from said lamp, an apertured latch member on said armature, a manually operable member movable to enter the aperture in said latch and to move said switch means a first predetermined amount in its opposite direction of movement while said electromagnet is de-energized to disconnect said battery from said lamp, and to subsequently move said switch means a predetermined amount in its one direction of movement to lockingly engage said manually operable member and retain said switch means in its disconnecting position, and means including said armature arranged operable in response to energization of said electromagnet to release said latch from engagement with said manually operable member.

2. An emergency lighting unit comprising, in combination, a relay including an armature and including an electromagnet connectable to a source of power, a battery, a lamp, switch means operably connected with said armature and movable in response to movement of said armature in response to de-energization of said electromagnet to connect said battery to said lamp in closed circuit relation, said switch means being movable in response to movement of said armature in response to energization of said electromagnet to disconnect said battery from said lamp, latch means connected with said armature, manually operable means movable to engage said latch means to effect movement of said switch means to disconnect said battery from said lamp while said electromagnet is de-energized and to then lock said switch means in open-circuit position, and means including said armature operable in response to subsequent energization of said electromagnet to unlock said switch means and thereby release said switch means for normal operation in response to subsequent energization and de-energization of said electromagnet, respectively.

References Cited in the file of this patent

UNITED STATES PATENTS

| | | |
|---|---|---|
| 905,935 | Schietzel | Dec. 8, 1908 |
| 1,955,616 | Wallace | Apr. 17, 1934 |
| 2,009,504 | Larson | July 30, 1935 |
| 2,097,236 | Hulst | Oct. 26, 1937 |